April 16, 1929.   D. M. MORRIS   1,709,536
SPRING TOOTH MOUNTING
Filed Dec. 4, 1924
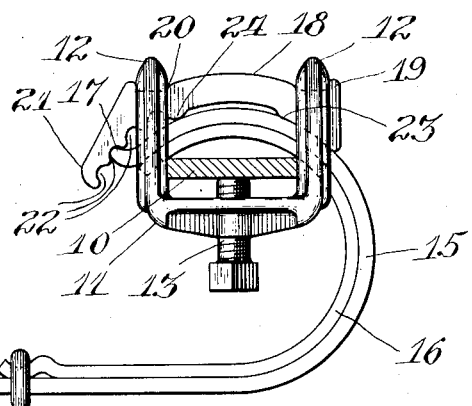
Fig.1.
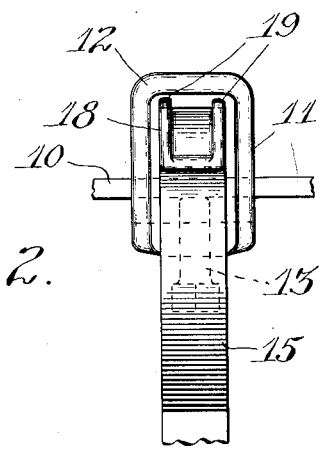
Fig.2.
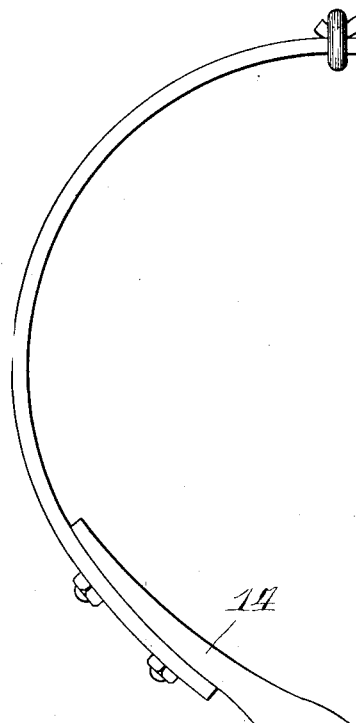
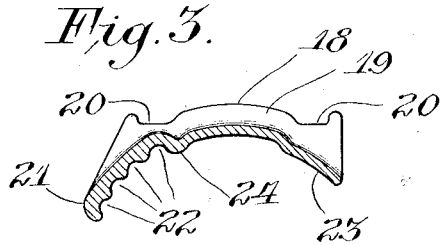
Fig.3.   Fig.4.
Inventor.
David M. Morris,
By H. P. Doolittle
Atty.

Patented Apr. 16, 1929.

1,709,536

UNITED STATES PATENT OFFICE.

DAVID M. MORRIS, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY.

SPRING-TOOTH MOUNTING.

Application filed December 4, 1924. Serial No. 753,787.

This invention is directed to improvement of the holding or clamping means for cultivator or harrow teeth and particularly to means for adjustably clamping the shank of a spring tooth on its supporting bar.

The objects of the invention are to simplify the structure by providing a device employing few easily assembled parts capable of securely holding the tooth shank and permitting the working angle of the tooth to be readily changed.

Referring to the accompanying drawing,—

Fig. 1 is a side elevation of a tooth and mounting embodying the invention;

Fig. 2 is an end view of the mounting from the front;

Fig. 3 is a detail longitudinal section of the holding member employed in the mounting; and Fig. 4 is a plan view of the holding member.

In the present instance the invention has been illustrated as employed in the mounting of a spring cultivator tooth such as used on field cultivators and similar implements. The structure comprises the flat, transversely extending supporting bar shown in section at 10, it being understood that a number of similar teeth and mountings are carried by each bar. The mounting comprising the invention consists in combination with the bar 10 of a clamping member or stirrup 11 formed with parallel upright arch portions 12 embracing the bar 10. The lower or horizontal portion of the stirrup 11 is formed with a threaded aperture receiving the set screw 13 which engages the under side of the bar 10. The cultivator tooth is preferably of general S shape with its upper bend of shorter radius than the lower bend, which carries the tooth 14. The upper bend 15 of the tooth is preferably provided with the usual reinforcing piece 16 which conforms with the curve of that portion of the tooth, the two forming a curved shank portion which extends across the upper face of the supporting bar 10 and through the arches 12 of the saddle piece 11. The end of the shank is formed with an upturned tip 17 for a purpose to be described. For co-operation with the stirrup piece 11 and shank of the tooth there is provided a cross piece or holding member 18 which is seated on the curved end of the tooth shank and is itself curved to conform thereto. The member 18 is preferably formed with longitudinal marginal ribs 19 for strengthening purposes and these ribs are formed with transverse seats 20 for reception of the horizontal portions of the arches 12 on the stirrup member. The rear end of cross member 18 is formed with an angular extension 21 having a series of notches 22 on its under side, which are so positioned as to engage and interlock with the upturned end 17 of the tooth shank. On its underside the cross piece 18 is provided with a broad bearing portion or shoulder 23 bearing on the shank where it enters the first arch 12 and with a comparatively short projection or bearing shoulder 24 engaging the shank at a point so spaced from the end thereof that its pressure on the shank will act in conjunction with the point of engagement of the under side of the shank end with the corner of bar 10 to force the upturned end 17 of the shank into interlocking engagement with any one of the notches 22 in the extended end 21 of the cross member.

It will be understood that with the construction described and the parts asembled as shown in Fig. 1 drawing up of the set screw 13 will clamp the shank of the tooth between the member 18 and the bar 10, and it will be clear that the pressure of shoulder 24 on the upper side of the shank will cause the upturned end 17 of the shank to extend outwardly and tend to securely interlock with one of the notches 22. As the curved shank is securely held between the cross piece 18 and the corners of the bar 10 there is no possibility of slippage, but, nevertheless, a few turns of screw 13 will permit the tooth to be sufficiently released to allow it to be angularly adjusted by shifting the upturned end 17 from one notch 22 to another as desired.

The construction described exemplifies the preferred form of the invention, but it will be evident to those skilled in the art that modifications of structure may be made without departing from the gist of the invention as defined in the following claims.

What is claimed as new is:

1. A cultivator tooth mounting comprising the combination with a supporting bar of a stirrup piece having parallel arched portions embracing the bar, an arched cross member passing under said arches on one side of the bar and having one end extended and formed with a series of notches on its under side, a curved tooth shank positioned between the bar and the cross piece and having its end formed to selectively engage said notches, and a set screw carried by the stirrup piece and engaging the other side of the bar.

2. A cultivator tooth mounting comprising the combination with a supporting bar of a stirrup piece having parallel arched portions embracing the bar, a cross member passing under said arches on one side of the bar and having one end projecting outwardly, a curved tooth shank positioned between the bar and the cross piece with its end in interlocking engagement with the projecting end of the cross piece, and a set screw carried by the stirrup piece and engaging the other side of the bar.

3. A cultivator tooth mounting comprising the combination with a supporting bar of a stirrup piece having parallel arched portions embracing the bar, a cross member passing under said arches and extending across one side of the bar, a tooth shank positioned between the bar and the cross piece and having its end abutting against part of said cross member, and a set screw carried by the stirrup piece and engaging the other side of the bar.

4. A cultivator tooth mounting comprising the combination with a flat supporting bar of an upwardly curved tooth shank extending across the bar, a correspondingly curved holding member seated on the shank and formed with an extension constructed to interlock with the end of the shank, and means for clamping the shank between the bar and holding member including means tending to force the end of the shank into engagement with the extension on the holding member.

5. A cultivator tooth mounting comprising the combination with a supporting bar of a stirrup piece having parallel arched portions embracing the bar, a tooth shank extending through said arched members and across one side of the bar, a holding member engaging the end of the tooth shank and means engaging the opposite side of the bar for clamping the tooth shank between the bar and said members.

6. A device for adjustably and detachably securing the spring tooth of a tillage implement to a supporting member comprising a stirrup embracing the supporting member, a toothed cross piece engaging said stirrup and having a portion interlocking with a portion of said stirrup by engagement therewith, the spring tooth having its shank interposed between the supporting member and the cross piece and its end engaging the toothed portion of the cross piece, and means for moving said stirrup relative to the supporting member to clamp said tooth in fixed position relative to said supporting member.

7. A device for adjustably clamping the shank of a spring tooth on a supporting bar comprising a stirrup and a holding member, said holding member having interlocking portions some of which form external notches to enable the holding member to be held in interlocked relationship to the stirrup by engagement therewith, others of said interlocking portions forming internal notches for receiving said shank.

In testimony whereof I affix my signature.

DAVID M. MORRIS.